United States Patent [19]

Coale

[11] 4,032,683

[45] June 28, 1977

[54] STRUCTURAL MEMBER AND METHOD OF MAKING SAME

[75] Inventor: Harold D. Coale, Bartlesville, Okla.

[73] Assignee: Phillips Petroleum Company, Bartlesville, Okla.

[22] Filed: Sept. 27, 1976

[21] Appl. No.: 727,318

[52] U.S. Cl. .............................. 428/315; 264/46.4; 264/154; 264/155; 428/71; 428/137; 428/306

[51] Int. Cl.² ........................................... B32B 3/26

[58] Field of Search ............... 428/68, 69, 71, 137, 428/138, 306, 308, 309, 315, 310; 260/2.5 R, 2.5 A, 2.5 BE, 30.8; 264/46.4, 154, 155

[56] References Cited

UNITED STATES PATENTS

| | | | |
|---|---|---|---|
| 3,164,643 | 1/1965 | Hubbard | 428/909 |
| 3,286,784 | 11/1966 | Mariner | 428/138 |
| 3,592,724 | 7/1971 | King, Jr. et al. | 428/315 |
| 3,770,560 | 11/1973 | Elder et al. | 428/138 |
| 3,892,686 | 1/1975 | Woo | 260/2.5 BE |

*Primary Examiner*—William J. Van Balen

[57] ABSTRACT

A structural member is provided which is heat resistant and is formed from a mixture of poly(phenylene sulfide) resin and a filler with the structural member being comprised of an inner core formed from the poly(phenylene sulfide) and filler with the inner core having a cellular structure. The inner core is coated with poly(phenylene sulfide) which is fused and cured to provide additional strength for the member and to seal the porous inner core. Preferably, the structural member is of a honeycomb type having a plurality of voids to further lighten the member. Laminate members can be bonded or otherwise secured to the member to form a laminate type structure. The inner core portion of the structural member is made by molding the mixture and curing same to a predetermined degree of cure, after which the core portion is coated with a coating of poly(phenylene sulfide) which is then fused and cured.

14 Claims, 2 Drawing Figures

STRUCTURAL MEMBER AND METHOD OF MAKING SAME

Many types of honeycomb members and lightweight structural members are known and are useful for many purposes. It is desirable in certain applications to provide structural members of a honeycomb type which are light in weight, yet high in strength and also heat and fire resistant. It is also desirable to have such structural members which are easy and economical to manufacture in various shapes and sizes. However, it has been difficult to find a honeycomb material which exhibits the properties of heat and fire resistance, ease of manufacturing into various shapes and light in weight, resistant to absorption of various fluids and having a relatively high strength. Plastic resins have been useful in accomplishing the manufacture of members having some of these properties but generally improvement of one property was accomplished to the detriment of another property. The present invention provides an improved structural member exhibiting acceptable levels of these properties. To accomplish this, an inner core structure is made and is comprised of poly(phenylene sulfide) and a reinforcing filler material which are molded into a desired shape and preferably has a foaming agent to effect the manufacture of a foamed or cellular inner core member. This inner core member has a fused coating of poly(phenylene sulfide) thereon to seal the inner core and also improve the strength thereof. If desired, one or more laminate members can be bonded or otherwise secured to various surfaces of the structural member. Such a structural member is useful as a wall material for the interior of aircraft or as a laminated structure with various materials such as aluminum plates and used as a low weight floor material for aircraft or the like. Other construction or structural applications of this material can also be made.

The principal objects and advantages of the present invention are: to provide a structural member and method of making same wherein the structural member is light in weight, heat and fire resistant and relatively strong; to provide such a structural member which is easy to manufacture into various shapes and sizes with conventional processing equipment; to provide such a structural member which is resistant to absorption of fluids; to provide such a structural member which is adapted to be made easily into a honeycomb structure; to provide such a structural member which can be easily made into a laminate by the securing of laminate members thereto; and to provide such a structure and method of making same which is well adapted for its intended use.

Other objects and advantages of the present invention will become apparent from the following description taken in connection with the accompanying drawings wherein are set forth by way of illustration and example certain embodiments of the present invention.

Figure 1:
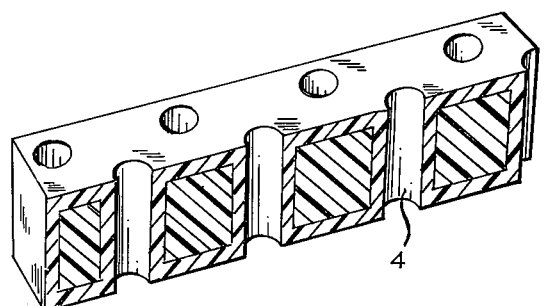
FIG. 1 is a perspective sectional view of a honeycomb structural member with an outer coating thereon enlarged for clarity.

Referring more in detail to the drawings:

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriate detailed structure.

Reference numeral 1 designates generally a structural member which is comprised of a cellular core portion 2 which has a coating 3 over substantially the entirety of the exposed surface thereof with the coating 3 of a material which includes a substantial portion of poly(phenylene sulfide). Preferably, although not required, the core 2 has a plurality of voids 4 such as through bores to effect lightening thereof. The structural member 1 can also include one or more laminate members 6 suitably bonded to surfaces of the coated cellular core 2 as, for example, by a suitable bonding agent 7. The laminate member 6 can be of any suitable structural material such as aluminum plate or other metals.

The poly(phenylene sulfide) used in this invention can be made by the process disclosed in U.S. Pat. No. 3,354,129 by J. T. Edmonds, Jr. et al, issued Nov. 21, 1967.

The cellular core portion 2 is comprised of poly(phenylene sulfide) in combination with one or more fillers, preferably a reinforcing filler, which also is preferably heat resistant as, for example, glass fibers, glass beads or hollow spheres, asbestos fibers and the like. Other filler materials can be used depending on the end application of the structural member 1. If a low temperature application is contemplated, then lower temperature fillers can be used and for high temperature application high temperature fillers can be used. Preferably, the filler is in an amount of approximately 15 to 80 percent by weight of the finished core portion 2 and the poly(phenylene sulfide) is preferably in a range of 85 to 20 percent by weight of the finished core portion 2. The density of the core portion 2 will be dependent upon the foaming agent and also the type of filler used. The density of the poly(phenylene sulfide) cellular portion of the core exclusive of the filler is about 0.05 grams/cc to 1.0 grams/cm³. This density is calculated as if the cellular poly(phenylene sulfide) had no filler present, i.e., by calculating according to the following formula:

$$D_c = \frac{W_R}{V_c} = \frac{W_R}{V_T - V_F} = \frac{W_R}{\frac{W_T}{D_T} - \frac{W_F}{D_F}}$$

where $D_c$ = density of the cellular poly(phenylene sulfide)
$W_R$ = weight of the poly(phenylene sulfide) resin
$V_c$ = volume of the cellular poly(phenylene sulfide)
$V_T$ = volume of the combined filler and cellular poly(phenylene sulfide)
$V_F$ = volume of the filler
$W_T$ = weight of the combined filler and cellular poly(phenylene sulfide)
$D_T$ = density of the combined filler and cellular poly(phenylene sulfide)
$W_F$ = weight of the filler
$D_F$ = density of the filler To make the core cellular, a foaming agent is used and typical foaming agents include water, sodium bicarbonate, detergent, etc. If water is used, a wetting agent such as EL-620 sold by General Anline Film (GAF) is added in a concentration of about 5% by weight to the mixture.

In a preferred embodiment the coating 3 is fused to the core 2 and comprises at least in a major portion and preferably is all poly(phenylene sulfide) which is suitably coated onto the cellular core portion 2 as more fully described hereinbelow and covers substantially all the exposed surfaces of the core portion 2 after same is manufactured. The coating 3 improves the strength of the cellular core portion 2 as, for example, three uncoated core samples 0.50 inches (1.27 cm) wide × 0.750 inches (1.90 cm) long × 0.375 inches (.952 cm) thick having holes through the faces 0.125 inches (0.320 cm) dia. 0.125 inches (0.320 cm) apart between two 0.250 inches (0.635 cm) thick aluminum plates and tested for compressive strength. The yield point for the three samples averaged 25.7 lbs. (12 kgs). Three identical but coated samples were tested in an identical manner and the average load at yield was 227 lbs. (103 kgs). The tests illustrated that the coating 3 enhances the strength of the cellular core portion 2. Also, the coating 3 seals the exposed surfaces of the core portion 2 making same more resistant to the absorption of fluids such as moisture in the air. Preferably, the coating 3 has a thickness of approximately 0.001 to 0.005 inches.

If voids 4 are desired to form a honeycomb-type structural member, the voids 4 can be positioned at any suitable position or in any suitable number as is dictated by the requirements of the end use. As, for example, the voids 4 can extend completely through the cellular core portion 2 and can be randomly spaced and positioned or can be positioned in straight lines or staggered lines or in any suitable manner. The purpose of the voids 4 is to lighten the structural member 1. As can be best seen in FIG. 1, the surfaces defining the voids 4 are also coated with the coating 3.

Figure 2:
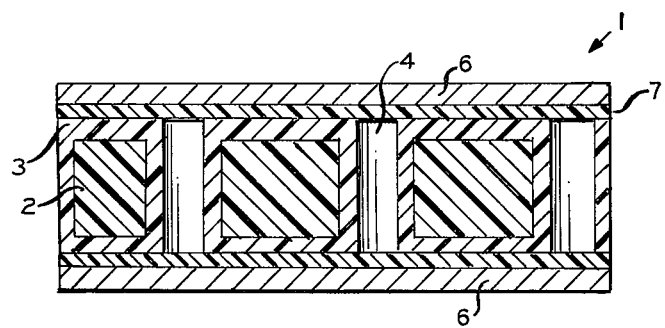
FIG. 2 is a side-elevational section view of a laminated honeycomb structural member with portions thereof enlarged for clarity.

As best seen in FIG. 2, the coated cellular core portion 2 can have suitably secured thereto laminate members 6 to form a laminated structure. The laminate member 6 can be secured to any desired surface of the coated core portion 2 and preferably is secured thereto by a bonding agent 7 such as liquid polyester or in certain cases the coating 3 could be used as the bonding agent as herein later described.

The method of making a structural member 1 broadly includes mixing poly(phenylene sulfide) with a suitable filler material and molding same to the desired shape and size by any suitable molding method. A foaming agent preferably is included in the mixture with poly(phenylene sulfide) so as to effect the manufacture of a cellular core 2. Suitable molding methods are known in the art to accomplish this and one preferred type includes making a mixture of poly(phenylene sulfide) and filler material with a liquid such as water as a foaming agent, and a wetting agent. The mixture forms a mud-like consistency which can be suitably placed in a mold, such as by troweling the mixture into the mold, which can be of a pin type mold to form a honeycomb-type structure wherein the pins form the voids 4. Alternately, if a mold without pins is used, the void can be formed in the core portion 2 by drilling holes therethrough. After placing the mixture in the mold, the core 2 is precured at a temperature and for a sufficient time to effect partial curing of the part or, if desired, total curing of the part after which the part is removed from the mold. If partial curing of the part was accomplished, then the removed part can be post-cured for a time and at a temperature sufficient to effect post-curing of the removed part wherein same can be substantially totally cured. Conditions for the above curing can be accomplished at parameters known in the art as, for example, precuring in the mold can be accomplished in an oven at a temperature of at least about 700° F. (370° C.) for 30 minutes and up to a temperature of approximately 800° F. (426° C.) for 15 minutes. Cure time will vary according to the thickness of the core 2. If fully cured, the core can be cured in an oven at 700° F. (370° C.) for 2 hours. These time and temperature relations are known in the art. Also, during the first molding step the temperature should be sufficient to activate the foaming agent to effect foaming of same so that the part will be cellular upon completion. If post-curing is used after the precure, post-curing preferably is accomplished at a temperature of about 700° F. (370° C.) up to about 800° F. (426° C.) for 1 and ½ to 2 hours. This again is dependent upon the thickness of the part and the degree of curing desired which are also known in the art.

In the molding of the cellular core portion 2, a non-pressurized molding process can be used and it is also to be realized that a pressure-type molding can be used to produce parts such as injection molding, compression molding, and the like, wherein a pressure is applied sufficient to form the part in the mold and yet not inhibit the foaming of the foaming agent. The foaming agent is added to the mixture in an amount sufficient to effect the desired amount of foaming to produce the desired cell-like structure in the core portion 2. This is determined of course by the desired end product desired.

After this, the cured part is coated with poly(phenylene sulfide) powder in any suitable manner such as by electrostatic spraying to form the coating 3. The coated part is then heated at a temperature of approximately 700° F. (370° C.) for a time sufficient to fuse the powder to effect partial curing of the coating as, for example, 30 minutes. If the coating is to be fully cured, the time is increased to 2 hours. It should be pointed out that the core 2 can be coated as a precured part wherein the coating and the part can be cured together at the higher temperature to effect the desired amount of curing. Preferably, the coating is placed on the part by an electrostatic process wherein powdered poly(phenylene sulfide) is deposited on the exposed surfaces of the cellular core portion 2. Electrostatic coating processes are known in the art and need not be further described herein. To produce a laminated part as seen in FIG. 2 a bonding agent is applied to the appropriate surfaces of the coated cellular core 2 with such bonding agents including liquid polyester. If the coating is to be used as the bonding agent, the coating is only partially cured as previously described and the laminate material such as aluminum plate is precoated with poly(phenylene sulfide) and then partially cured, as for example, at 700° F. (370° C.) for 30 minutes. The cellular core portion and laminate material are then combined in a press, placed under a load sufficient to hold the parts in engagement, and allowed to cool to form a unitary structure of high strength and low density. The bonding agents must be capable of securing a laminate member 6 to the coating. However, as pointed out above, it is to be realized that the coating 3 can also be used as a bonding agent for securing the laminate member 6 to the core portion 2. Suitable laminate members can include aluminum plates, steel, paperboard and the like.

EXAMPLE

Poly(phenylene sulfide) polymer having a density of 1.3 gm/cm$^3$ in the unfilled state, a melting temperature of about 545° F. (285° C. ) and a melt flow of 1000 (grams per minute) according to ASTM D1238-73 when using a 5000 gram load at a temperature of 600° F. (315° C.) was ground into a powder having a particle size sufficient that 98.2 percent would pass through a 200 mesh screen was formed into a mixture comprising by weight 42.5 percent poly(phenylene sulfide), 42.5 percent asbestos fibers ¼ long, 10 percent water, and 5 percent GAF EL-620 detergent. The mud-like mixture was troweled into a pan-like mold and heated in an oven at 700° F. (370° C.) for 2 hours, then cooled and removed from the mold to produce a cellular slab 0.375 inch (0.937 cm) thick. The slab was then drilled through the faces with a 0.093 inch (0.232 cm) dia. drill forming voids 0.187 inch (0.469 cm) apart. The honeycomb thus formed was spray coated with an unfilled poly(phenylene sulfide) powder using an electrostatic gun. A pair of 1/16 inch (0.156 cm) thick aluminum plates was also spray coated on one side with the same material. The plates and coated honeycomb were then placed in an oven separately and heated to 700° F. (370° C.) for 30 minutes. While still hot the components were held in engagement in a press and cooled thereby forming the laminate wherein the bonding agent was the poly(phenylene sulfide) coating.

It is to be understood that while I have illustrated and described certain forms of my invention, it is not to be limited to the specific form or arrangement of parts herein described and shown.

What is claimed and desired to be secured by letters patent is:

1. A heat resistant article of reinforced plastic comprising:
   a. a structural member comprised of cellular poly(phenylene sulfide) and at least one reinforcing filler with said poly(phenylene sulfide) being at least partially cured and is in an amount of at least about 20 weight percent of the member; and
   b. a coating on said member, said coating is at least partially comprised of poly (phenylene sulfide) and is at least partially cured.
2. The article as set forth in claim 1 wherein:
   a. said member has a plurality of through bores defined by surfaces, said bore defining surfaces have said coating thereon.
3. The article as set forth in claim 2 wherein:
   a. said filler includes a heat resistant filler.
4. The article as set forth in claim 3 wherein:
   a. said heat resistant filler includes at least one of fiber glass and asbestos.
5. The article as set forth in claim 1 wherein:
   a. said member is cellular with the cellular portion, exclusive of the filler, having a density of between about 0.05 to 0.1 grams/cc.
6. The article as set forth in claim 5 including:
   a. a laminate member bonded to at least one surface of said member.
7. A method of making a heat resistant article of reinforced plastic comprising:
   a. forming a mixture of poly(phenylene sulfide), at least one reinforcing filler and a foaming agent;
   b. molding said mixture into a desired shape in a mold to form a cellular structural member;
   c. at least partially curing said mixture during molding;
   d. removing said member from the mold;
   e. coating said member with a coating comprised of poly(phenylene sulfide): and
   f. at least partially curing said coating.
8. The method as set forth in claim 7 wherein:
   a. said mixture contains a foaming agent whereby said member is cellular after curing with the density of the cellular portion, exclusive of the filler, being between about 0.05 to 1.0 grams/cc.
9. The method as set forth in claim 8 including:
   a. at least partially post-curing said member after removing same from the mold and before coating same.
10. The method as set forth in claim 8 wherein:
    a. said reinforcing filler including at least one of fiber glass and asbestos and said poly(phenylene sulfide) is in an amount of at least about 20 percent by weight of the member.
11. The method as set forth in claim 10 including:
    a. forming a plurality of holes in said member during molding; and
    b. coating surfaces defining said holes with poly(phenylene sulfide) during the coating of the member.
12. The method as set forth in claim 11 wherein:
    a. said coating is coated on the member electrostatically.
13. The method as set forth in claim 12 wherein:
    a. said curing during molding is at a temperature of at least about 700° F. for a time sufficient to effect foaming and to make the member sufficiently rigid to remove same from the mold;
    b. said member is substantially completely cured after molding and before coating; and
    c. said coating is substantially completely cured.
14. The method as set forth in claim 8 including:
    a. bonding a laminate member to at least one surface of the coated member.

* * * * *